United States Patent
Lacaux et al.

(10) Patent No.: US 12,151,565 B1
(45) Date of Patent: Nov. 26, 2024

(54) FAULT TOLERANT POWER ARCHITECTURE

(71) Applicant: Amazon Technologies, Inc., Seattle, WA (US)

(72) Inventors: Frederic Pierre Lacaux, Kirkland, WA (US); Xiaoqi Wang, Bellevue, WA (US); Jianqi Shang, Mill Creek, WA (US); Larry W. Juang, Seattle, WA (US); Andrew Lueneburg, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 25 days.

(21) Appl. No.: 17/934,068

(22) Filed: Sep. 21, 2022

(51) Int. Cl.
*B60L 3/00* (2019.01)
*B64D 27/24* (2006.01)
*B64U 50/19* (2023.01)

(52) U.S. Cl.
CPC .......... *B60L 3/0069* (2013.01); *B60L 3/0046* (2013.01); *B64D 27/24* (2013.01); *B60L 2200/10* (2013.01); *B64D 2221/00* (2013.01); *B64U 50/19* (2023.01)

(58) Field of Classification Search
None
See application file for complete search history.

(56) References Cited

U.S. PATENT DOCUMENTS

| | | | |
|---|---|---|---|
| 11,128,251 B1 | 9/2021 | Solodovnik et al. | |
| 11,271,515 B2 | 3/2022 | Kimura et al. | |
| 2010/0140415 A1* | 6/2010 | Goossen | B64U 30/26 29/889.7 |
| 2012/0182024 A1* | 7/2012 | Ike | G01R 31/52 324/509 |
| 2014/0300180 A1* | 10/2014 | Iwashita | B60L 3/04 307/10.1 |
| 2016/0236790 A1 | 8/2016 | Knapp et al. | |
| 2017/0246959 A1* | 8/2017 | Loftus | B60L 1/00 |
| 2019/0334468 A1 | 10/2019 | Stauffer et al. | |

* cited by examiner

*Primary Examiner* — Jas A Sanghera
(74) *Attorney, Agent, or Firm* — Athorus, PLLC (57) ABSTRACT

Described are systems and methods for providing a fault tolerant electrical power system that is configured to continue operating through various fault and/or failure conditions, so as to withstand certain single points of fault and/or failure conditions. Exemplary embodiments of the present disclosure can provide an exemplary electrical power system that includes various components that are electrically coupled to a shared direct current (DC) bus via protection devices that are configured to isolate the various components in the event of certain fault and/or failure conditions. Additionally, the exemplary electrical power system can also include a high-impedance midpoint grounding connection configured to shift the voltages of the shared DC bus in view of certain fault and/or failure conditions, as well as introducing certain separations (e.g., physical and/or electrical) to mitigate the possibility of certain faults and/or failure conditions.

20 Claims, 8 Drawing Sheets

FAULT TOLERANT POWER ARCHITECTURE

BACKGROUND

Nearly all electrical devices employ an electrical power system designed to supply electrical power from a power supply (e.g., battery, etc.) to one or more electrical loads (e.g., controllers, processors, sensors, lights, motors, input/output devices, etc.) utilized by the electrical device. Traditional electrical power systems typically include a direct current (DC) bus that electrically couples a power supply to various electrical loads requiring power from the power supply and a negative DC bus that has a low-impedance connection to ground. Although many such traditional electrical power systems may be designed in view of low complexity and low cost, such traditional electrical power systems may be susceptible to fault and/or failure conditions. For example, such traditional electrical power systems may be vulnerable to single points of fault and/or failure conditions, which can render the electrical power system inoperable, thereby potentially resulting in catastrophic failure of the electrical device. This can be of particular significance and/or problematic in certain applications, such as aerospace applications.

DETAILED DESCRIPTION

As is set forth in greater detail below, exemplary embodiments of the present disclosure are generally directed to systems and methods for providing a fault tolerant electrical power system that is configured to continue operating through various fault and/or failure conditions, so as to withstand certain single points of fault and/or failure conditions. Accordingly, exemplary embodiments of the present disclosure may be implemented in applications that require high criticality, such as an aerial vehicle (e.g., an unmanned aerial vehicle (UAV), etc.) to facilitate operation of the aerial vehicle through certain fault and/or failure conditions, so as to avoid a critical failure in such highly critical applications. Exemplary embodiments of the present disclosure can provide an exemplary electrical power system that includes various components that are electrically coupled to a shared direct current (DC) bus via protection devices that are configured to isolate the various components in the event of certain fault and/or failure conditions. For example, the power supply and the electrical loads may each be electrically coupled to the shared DC bus via respective protection devices, which can be configured to isolate the corresponding components (e.g., the respective power supply and/or electrical load) in the event of certain electrical fault and/or failure conditions. Additionally, the exemplary electrical power system can also include a high-impedance midpoint grounding connection configured to shift the voltages of the shared DC bus in view of certain fault and/or failure conditions, as well as introducing certain separations (e.g., physical and/or electrical) to mitigate the possibility of certain faults and/or failure conditions.

In an exemplary implementation, the exemplary electrical power system can include a power supply that includes multiple power supplies, and each power supply may be electrically coupled to a shared DC bus via a corresponding protection device, such that in the event of a fault and/or failure condition associated with any one of the multiple power supplies, the protection device may be tripped, so as to isolate the faulty power supply from the shared DC bus. Similarly, each electrical load may be electrically coupled to the shared DC bus via a corresponding protection device, such that in the event of a fault and/or failure condition associated with any one of the multiple power supplies, the protection device may be tripped, so as to isolate the electrical load from the shared DC bus. In an exemplary implementation where the exemplary electrical power system is employed in an aerial vehicle, the electrical loads may include, for example, high voltage electrical loads, such as motor drive units (e.g., electrical speed controllers (ESC)) configured to drive and/or control electric motors associated with the propulsion mechanisms of the aerial vehicle, as well as low voltage electrical loads, such as avionics systems, other controllers/processors, and the like.

Accordingly, in an exemplary implementation where the aerial vehicle may experience a fault and/or failure condition associated with one of the power supplies, the protection device associated with the faulty power supply may be tripped, so as to isolate the faulty power supply, and the aerial vehicle may continue to operate in a reduced battery power mode. Similarly, in an exemplary implementation where the aerial vehicle may experience a fault and/or failure condition associated with one of the motor drive units, the protection device associated with the faulty motor drive unit may be tripped, so as to isolate the faulty motor drive unit, and the aerial vehicle may continue to operate in a reduced thrust mode.

Additionally, the exemplary electrical power system according to exemplary embodiments of the present disclosure can also include a high-impedance midpoint grounding configuration. For example, the midpoint of each power supply may be electrically coupled to ground via a high-impedance network. This grounding scheme can, for example, facilitate shifting of the voltage on the shared DC bus without affecting the voltage provided to the electrical loads in the event of certain fault and/or failure conditions.

Further, the exemplary electrical power system, according to exemplary embodiments of the present disclosure, can also include physical and electrical separation between the positive and negative rails of the shared DC bus, to mitigate the possibility of a line-to-line short circuit fault and/or failure condition.

In an exemplary implementation, each of the multiple power supplies of the exemplary electrical power system may be configured as a battery string made up of a plurality of individual batter cells connected in series, and each battery string may be electrically coupled to the shared DC bus via a protection device, such as a fast-acting switch. Further, the high-impedance midpoint grounding configuration may also include a protection device (e.g., switch, circuit breaker, fuse, etc.), so as to isolate and clear certain fault and/or failure conditions experienced by the battery strings. Alternatively and/or in addition, each battery string may include distributed internal protection devices (e.g., switches, circuit breakers, fuses, fusible links, etc.), which can also be configured to isolate and clear certain fault and/or failure conditions experienced by the battery strings.

Advantageously, exemplary embodiments of the present disclosure may be implemented in an aerial vehicle to facilitate continued operation of the aerial vehicle, even when certain fault and/or failure conditions are experienced by the aerial vehicle. The exemplary electrical power system can facilitate continued operation in reduced power and/or thrust configurations. Further, although the exemplary embodiments of the present disclosure are primarily described with respect to electrical power systems implemented in an aerial vehicle, exemplary embodiments of the present disclosure may be relevant to other applications and implementations.

Figure 1:
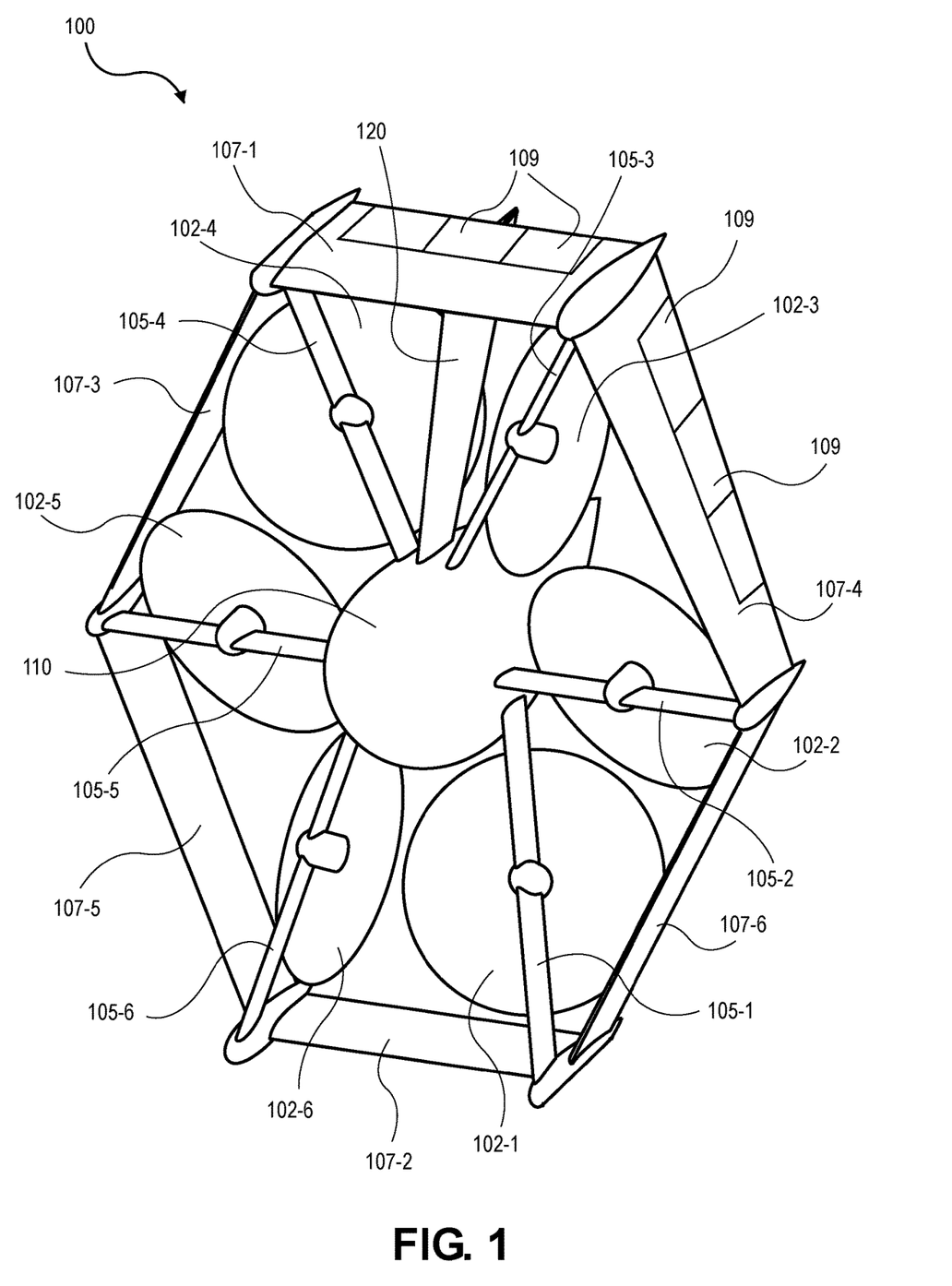
FIG. 1 illustrates an exemplary unmanned aerial vehicle, according to exemplary embodiments of the present disclosure.

FIG. 1 illustrates an exemplary unmanned aerial vehicle 100, according to exemplary embodiments of the present disclosure.

As shown in FIG. 1, aerial vehicle 100 may include a ring wing that is substantially hexagonal in shape and that surrounds a plurality of propulsion mechanisms. Aerial vehicle 100 may include six propulsion mechanisms 102-1, 102-2, 102-3, 102-4, 102-5, and 102-6 spaced about fuselage 110 of aerial vehicle 100. Although aerial vehicle 100 is shown with six propulsion mechanisms 102, aerial vehicle 100 may include any number of propulsion mechanisms 102. Propulsion mechanisms 102 may include electric motors, propellers, or any other form of propulsion and may each be controlled by respective power electronic/motor drive units, such as inverters, electronic speed controllers (ESCs), electronic torque controllers, and the like. Further, one or more of propulsion mechanisms 102 of aerial vehicle 100 may utilize fans, jets, turbojets, turbo fans, jet engines, and/or the like to maneuver the aerial vehicle. Generally described, propulsion mechanism 102, as used herein, can include any form of propulsion mechanism that is capable of generating a force sufficient to maneuver aerial vehicle 100, alone and/or in combination with other propulsion mechanisms. Furthermore, in certain implementations, propulsion mechanisms 102 may be configured such that their individual orientations may be dynamically modified.

Likewise, while the examples herein describe the propulsion mechanisms being able to generate force in either direction, in some implementations, the propulsion mechanisms may only generate force in a single direction. However, the orientation of the propulsion mechanisms may be adjusted so that the force can be oriented in a positive direction, a negative direction, and/or any other direction.

In the illustrated implementation, aerial vehicle 100 can also include ring wing 107 having a substantially hexagonal shape that extends around and forms the perimeter of aerial vehicle 100. In the illustrated example, ring wing 107 can include six segments 107-1, 107-2, 107-3, 107-4, 107-5, and 107-6 that are joined at adjacent ends to form ring wing 107 around aerial vehicle 100. Each segment of ring wing 107 has an airfoil shape to produce lift when aerial vehicle 100 is oriented and moving in a direction that is substantially horizontal. As illustrated, and discussed further below, the ring wing is positioned at a canted angle with respect to fuselage 110, such that lower segment 107-2 of ring wing 107 acts as a front wing as it is toward the front of the aerial vehicle when oriented as shown and moving in a horizontal direction. Upper segment 107-1 of ring wing 107, which has a longer chord length than lower segment 107-2 of ring wing 107, is positioned in a horizontal orientation, further back relative to lower segment 107-2, and thus can act as a rear wing.

Ring wing 107 can be secured to fuselage 110 by motor arms 105. In this example, motor arms 105-1, 105-2, 105-3, 105-4, 105-5, and 105-6 are coupled to fuselage 110 at one end and are coupled to ring wing 107 at a second end, thereby securing ring wing 107 to fuselage 110. In other implementations, less than all of motor arms 105 may extend from fuselage 110 and couple to ring wing 107.

In some implementations, aerial vehicle 100 may also include one or more stabilizer fins 120 that extend from fuselage 110 to ring wing 107. Stabilizer fin 120 may also have an airfoil shape. In the illustrated example, stabilizer fin 120 extends vertically from fuselage 110 to ring wing 107. In other implementations, stabilizer fin 120 may be disposed at other positions. For example, stabilizer fin 120 may extend downward from fuselage 110 between motor arm 105-1 and motor arm 105-6.

As illustrated, propulsion mechanisms 102 may be oriented at different angles with respect to each other. For example, propulsion mechanisms 102-2 and 102-5 can be aligned with fuselage 110 such that the force generated by each of propulsion mechanisms 102-2 and 102-5 is in-line or in the same direction or orientation as the fuselage. In the illustrated example, aerial vehicle 100 is oriented for high-speed, fixed-wing, wing-borne, horizontal flight such that the fuselage is oriented horizontally in the direction of travel. In such an orientation, propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of fuselage 110. Accordingly, when aerial vehicle 100 is oriented for horizontal flight, propulsion mechanisms 102-1, 102-3, 102-4, and 102-6 may be used to provide thrust in a non-horizontal direction to cause the aerial vehicle to pitch, yaw, roll, heave and/or sway. In other implementations, during horizontal flight, propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by propulsion mechanisms 102-2 and 102-5.

The angle of orientation of each of the propulsion mechanisms 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, may each be oriented different amounts, and/or in different directions. Further, the configuration and arrangement of propulsion mechanisms 102-1, 102-2, 102-3, 102-4, 102-5, and 102-6 may also facilitate load balancing operation of aerial vehicle 100 in the event that one or more of propulsion mechanisms 102-1, 102-2, 102-3, 102-4, 102-5, and 102-6 may be operating in twophase mode in view of a failure or fault condition associated with the power electronics/motor drive unit and/or ESC associated with propulsion mechanisms 102-1, 102-2, 102-3, 102-4, 102-5, and 102-6.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of propulsion mechanisms 102-1, 102-2, 102-3, 102-4, 102-5, and 102-6 is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about third motor arm 105-2 and oriented toward propulsion mechanism 102-3. Finally, propulsion mechanism 102-4 is oriented approximately thirty degrees in the first direction about fourth motor arm 105-4 and toward propulsion mechanism 102-5. As illustrated, propulsion mechanisms 102-3 and 102-6, which are on opposing sides of fuselage 110, are aligned and oriented in a same first direction (in this example, horizontal). Propulsion mechanisms 102-2 and 102-5, which are on opposing sides of fuselage 110, are aligned and oriented in a same second direction, which is angled compared to the first direction. Propulsion mechanisms 102-1 and 102-4, which are on opposing sides of fuselage 110, are aligned and oriented in a same third direction, which is angled compared to the first direction and the second direction.

Further, fuselage 110 may be sized, dimensioned, and/or configured to house and/or store one or more components of aerial vehicle 100, such as an aerial vehicle control system, an electrical power supply, a power supply (e.g., one or more batteries, etc.), a battery management system (which may be implemented as part of the aerial vehicle control system and/or as a separate and discrete system), and/or a payload that is transported by aerial vehicle 100. Preferably, the power supply may include one or more batteries and/or battery packs made up of numerous battery cells connected in series. Likewise, in some implementations, the power supply may be removable and replaceable with different second power supplies for different flight durations, different total vehicle weight, replacement, and the like.

Figure 2A:
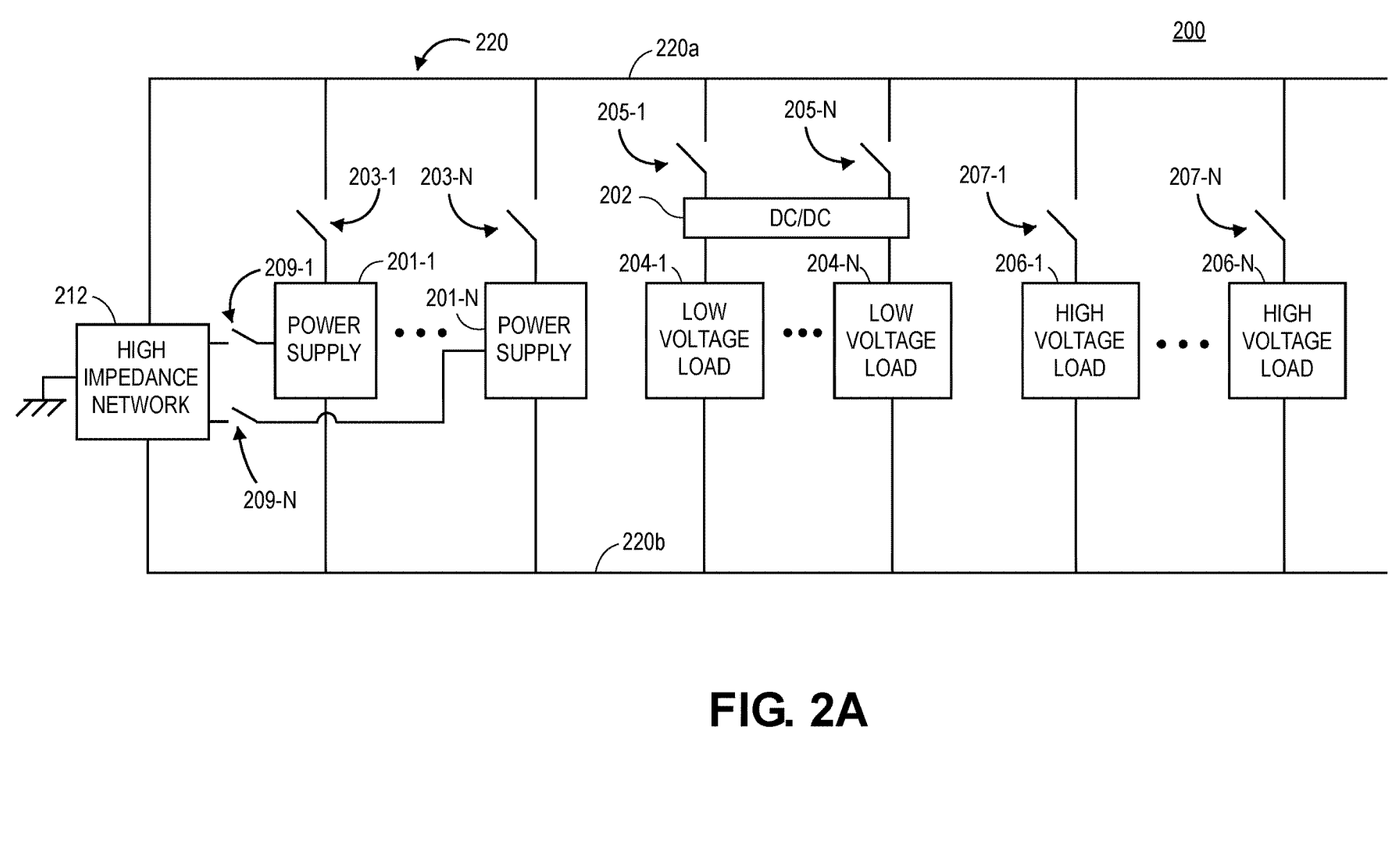
FIGS. 2A and 2B are block diagrams illustrating simplified exemplary electrical power systems, according to exemplary embodiments of the present disclosure.
Figure 2B:
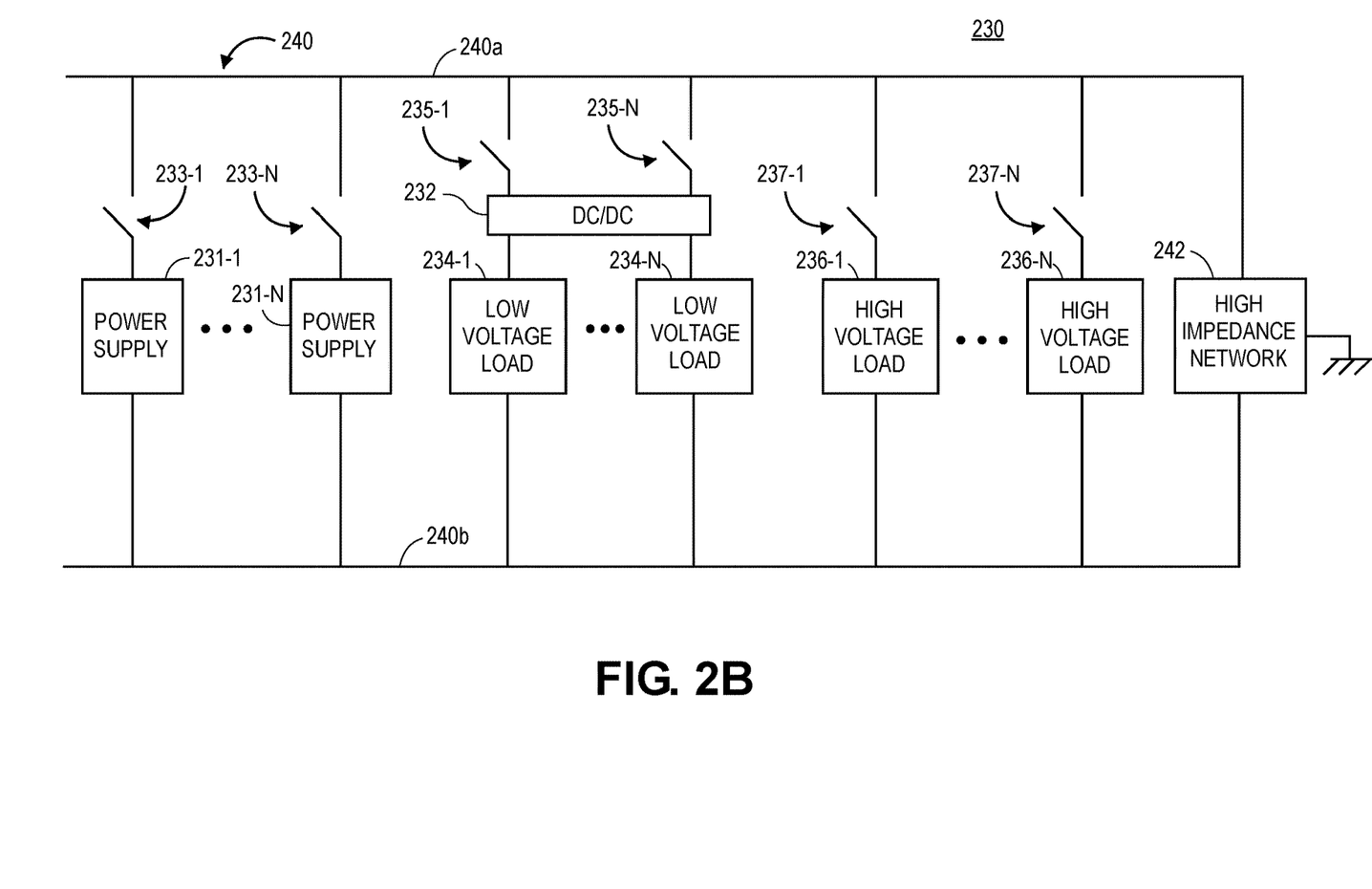

FIGS. 2A and 2B are block diagrams illustrating simplified exemplary electrical power systems 200 and 230, according to exemplary embodiments of the present disclosure.

As shown in FIG. 2A, electrical power system 200 can include power supplies 201, DC-to-DC converter 202, low voltage electrical loads 204, and high voltage electrical loads 206 all electrically coupled to a shared direct current (DC) bus 220, with positive voltage rail 220a and negative voltage rail 220b. As shown in FIG. 2A, power supplies 201 may be electrically coupled to shared DC bus 220 via respective protection devices 203, low voltage electrical loads 204 may be electrically coupled to shared DC bus 220 via DC-to-DC converter 202 and respective protection devices 205, and high voltage electrical loads 206 may be electrically coupled to shared DC bus 220 via respective protection devices 207. Specifically, power supplies 201-1 and 201-N may be electrically coupled to shared DC bus 220 via respective protection devices 203-1 and 203-N, respectively, low voltage electrical loads 204-1 and 204-N may be electrically coupled to shared DC bus 220 via DC-to-DC converter 202 and respective protection devices 205-1 and 205-N, respectively, and high voltage electrical loads 206-1 and 206-N may be electrically coupled to shared DC bus 220 via respective protection devices 207-1 and 207-N, respectively.

Further, electrical power system 200 may include a high-impedance midpoint ground configuration where a midpoint of power supplies 201 may be electrically coupled via respective protection devices 209 (e.g., switches 209-1 and 209-N) to ground via high-impedance network 212. In the exemplary implementation illustrated in FIG. 2A, the midpoint grounding configuration may be implemented as part of the source (e.g., as part of the batteries making up power supplies 201) of electrical power system 200. However, according to exemplary embodiments of the present disclosure, the midpoint grounding configuration may be implemented anywhere within electrical power system 200.

As illustrated in FIG. 2A, electrical power system 200 may include any number of power supplies 201, low voltage electrical loads 204, and/or high voltage electrical loads 206. According to exemplary embodiments of the present disclosure, power supplies 201 may each include a battery string comprised of serially connected battery cells. Further, in an exemplary implementation where electrical power system 200 may be employed in an aerial vehicle (e.g., aerial vehicle 100), low voltage electrical loads 204 may include, for example, avionics systems (e.g., navigational systems, communication systems, flight controllers, sensing systems, etc.), processors, controllers, and/or other low voltage electrical components, DC-to-DC converter 202 may include one or more step-down converters configured to convert the voltage on shared DC bus 220 to one or more voltages that are suitable for low voltage electric loads 204, and high voltage electrical loads 206 may include power electronics components, such as, for example, inverters, electronic speed controllers, electronic torque controllers, and the like, which may be configured to drive and/or control electric motors, which may be associated with propulsion mechanisms (e.g., propulsion mechanisms 102) of the aerial vehicle.

According to exemplary embodiments of the present disclosure, power supplies 201 may each include a battery string comprised of serially connected battery cells. In certain exemplary implementations, each battery string may include distributed internal protection devices (e.g., switches, circuit breakers, fuses, fusible links, etc.) between at least some of the individual battery cells, which can also be configured to isolate and clear certain fault and/or failure conditions experienced by each battery string.

Further, protection devices 203, 205, 207, and 209 may include any type of protection and/or isolation device which may be configured to electrically isolate a corresponding component (e.g., power supplies 201, low voltage electrical loads 204, high voltage electrical loads 206, etc.). For example, protection devices 203, 205, 207, and/or 209 may include switches, fuses, circuit breakers, fusible links, and the like, which may be configured to electrically isolate a corresponding component in view of certain fault and/or failure conditions.

According to exemplary embodiments of the present disclosure, electrical power system 200 may be configured to facilitate continued operation in the event of certain fault and/or failure conditions. For example, in the event of a line to ground fault and/or failure condition (e.g., a short circuit condition from positive voltage rail 220a to ground or negative voltage rail 220b to ground), the midpoint grounding configuration via high-impedance network 212 can facilitate shifting of the voltages on shared DC bus 220, while facilitating continued operation with the shifted voltages. Specifically, in an exemplary implementation where the rail-to-rail voltage is $V_{DC}$ (e.g., between positive voltage rail 220a and negative voltage rail 220b), a line to ground fault and/or failure condition would result in the voltages of shared DC bus 220 shifting such that the voltage on positive voltage rail 220a is $\frac{1}{2}V_{DC}$ and the voltage on negative voltage rail 220b is $-\frac{1}{2}V_{DC}$. Accordingly, although the voltages on positive voltage rail 220a and negative voltage rail 220b have shifted, the rail-to-rail voltage on shared DC bus 220 is maintained at $V_{DC}$, thereby facilitating continued operation of the various loads (e.g., low voltage electrical loads 204 and/or high voltage electrical loads 206).

Electrical power system 200 can also facilitate continued operation during other types of fault and/or failure conditions. In further exemplary implementations, in the event that power supply 201-1 experiences a fault and/or failure condition (e.g., internal short circuit within a battery cell, short circuit within the battery string, etc.), protection devices 203-1 and 209-1 may be opened to isolate power supply 201-1, so as to clear the fault and/or failure condition, and electrical power system 200 may facilitate continued operation under a reduced electrical power mode, where electrical power is provided by the remaining power supplies (e.g., power supply 201-N) in view of power supply 201-1 being isolated by protection devices 203-1 and 209-1. Similarly, in the event that low voltage electrical load 204-1 experiences a fault and/or failure condition (e.g., internal short circuit, etc.), protection device 205-1 may be opened, so as to isolate low voltage electrical load 204-1 and/or DC-to-DC converter 202. Accordingly, although low voltage electrical load 204-1 may no longer be operable, operation may continue in a reduced capability mode in view of the isolation of low voltage electrical load 204-1. Similarly, in the event that high voltage electrical load 206-1 experiences a fault and/or failure condition (e.g., internal short circuit, etc.), protection device 207-1 may be opened, so as to isolate high voltage electrical load 206-1. In an exemplary implementation where high voltage electrical load 206-1 may include a motor driver configured to drive and/or control an electric motor, electrical power system 200 may facilitate continued operation under a reduced thrust mode in view of the isolation of high voltage electrical load 206-1 and no thrust being generated by the electric motor.

FIG. 2B is a block diagram of exemplary electrical power system 230, according to exemplary embodiments of the present disclosure. Electrical power system 230 shown in FIG. 2B is substantially similar to electrical power system 200 illustrated in FIG. 2A, and can include power supplies 231, DC-to-DC converter 232, low voltage electrical loads 234, and high voltage electrical loads 236 all electrically coupled to a shared direct current (DC) bus 240, with positive voltage rail 240a and negative voltage rail 240b. Further, power supplies 231 may be electrically coupled to shared DC bus 240 via respective protection devices 233, low voltage electrical loads 234 may be electrically coupled to shared DC bus 240 via DC-to-DC converter 232 and respective protection devices 235, and high voltage electrical loads 236 may be electrically coupled to shared DC bus 240 via respective protection devices 237. Specifically, power supplies 232-1 and 232-N may be electrically coupled to shared DC bus 240 via respective protection devices 233-1 and 233-N, respectively, low voltage electrical loads 234-1 and 234-N may be electrically coupled to shared DC bus 240 via DC-to-DC converter 232 and respective protection devices 235-1 and 235-N, respectively, and high voltage electrical loads 236-1 and 236-N may be electrically coupled to shared DC bus 240 via respective protection devices 237-1 and 237-N, respectively.

Further, electrical power system 230 may include any number of power supplies 231, low voltage electrical loads 234, and/or high voltage electrical loads 236. According to exemplary embodiments of the present disclosure, power supplies 231 may each include a battery string comprised of serially connected battery cells. In certain exemplary implementations, each battery string may include distributed internal protection devices (e.g., switches, circuit breakers, fuses, fusible links, etc.) between at least some of the individual battery cells, which can also be configured to isolate and clear certain fault and/or failure conditions experienced by each battery string. Further, in an exemplary implementation where electrical power system 230 may be employed in an aerial vehicle (e.g., aerial vehicle 100), low voltage electrical loads 234 may include, for example, avionics systems (e.g., navigational systems, communication systems, flight controllers, sensing systems, etc.), processors, controllers, and/or other low voltage electrical components, DC-to-DC converter 232 may include one or more step-down converters configured to convert the voltage on shared DC bus 240 to one or more voltages that are suitable for low voltage electric loads 234, and high voltage electrical loads 236 may include power electronics components, such as, for example, inverters, electronic speed controllers, electronic torque controllers, and the like, which may be configured to drive and/or control electric motors, which may be associated with propulsion mechanisms (e.g., propulsion mechanisms 102) of the aerial vehicle.

Further, protection devices 233, 235, and 237, may include any type of protection and/or isolation device which may be configured to electrically isolate a corresponding component (e.g., power supplies 231, low voltage electrical loads 234, high voltage electrical loads 236, etc.). For example, protection devices 233, 235, and/or 237 may include switches, fuses, circuit breakers, fusible links, and the like, which may be configured to electrically isolate a corresponding component in view of certain fault and/or failure conditions.

However, unlike electrical power system 200, which may include a high-impedance midpoint ground configuration which may be implemented as part of the source (e.g., as part of the batteries making up power supplies 201) of electrical power system 200, electrical power system 230 may include a midpoint grounding configuration that may be implemented somewhere other than the source of electrical power system 230. As illustrated in FIG. 2B, the high-impedance midpoint grounding configuration may be implemented via high-impedance network 242. For example, the impedances presented by high-impedance network 242 can define ground relative to the voltages presented on shared DC bus 240. An implementation of high-impedance network 242 is described in further detail herein in connection with FIG. 3.

Otherwise, electrical power system 230 may operate substantially similarly to electrical power system 200. Similarly, electrical power system 230 may be configured to facilitate continued operation in the event of certain fault and/or failure conditions. For example, in the event of a line to ground fault and/or failure condition (e.g., a short circuit condition from positive voltage rail 240a to ground or negative voltage rail 240b to ground), the midpoint grounding configuration via high-impedance network 242 can facilitate shifting of the voltages on shared DC bus 240, while facilitating continued operation with the shifted voltages. Specifically, in an exemplary implementation where the rail-to-rail voltage is $V_{DC}$ (e.g., between positive voltage rail 240a and negative voltage rail 240b), a line to ground fault and/or failure condition would result in the voltages of shared DC bus 240 shifting such that the voltage on positive voltage rail 240a is ½$V_{DC}$ and the voltage on negative voltage rail 240b is −½$V_{DC}$. Accordingly, although the voltages on positive voltage rail 240a and negative voltage rail 240b have shifted, the rail-to-rail voltage on shared DC bus 240 is maintained at $V_{DC}$, thereby facilitating continued operation of the various loads (e.g., low voltage electrical loads 234 and/or high voltage electrical loads 236).

Electrical power system 230 can also facilitate continued operation during other types of fault and/or failure conditions. In further exemplary implementations, in the event that power supply 231-1 experiences a fault and/or failure condition (e.g., internal short circuit within a battery cell, short circuit within the battery string, etc.), protection device 233-1 (e.g., as well as one or more distributed internal protection devices which may be implemented in power supply 231-1) may be opened to isolate power supply 231-1, so as to clear the fault and/or failure condition, and electrical power system 230 may facilitate continued operation under a reduced electrical power mode, where electrical power is provided by the remaining power supplies (e.g., power supply 231-N) in view of power supply 231-1 being isolated by protection device 233-1. Similarly, in the event that low voltage electrical load 234-1 experiences a fault and/or failure condition (e.g., internal short circuit, etc.), protection device 235-1 may be opened, so as to isolate low voltage electrical load 234-1 and/or DC-to-DC converter 232. Accordingly, although low voltage electrical load 234-1 may no longer be operable, operation may continue in a reduced capability mode in view of the isolation of low voltage electrical load 234-1. Similarly, in the event that high voltage electrical load 236-1 experiences a fault and/or failure condition (e.g., internal short circuit, etc.), protection device 237-1 may be opened, so as to isolate high voltage electrical load 236-1. In an exemplary implementation where high voltage electrical load 236-1 may include a motor driver configured to drive and/or control an electric motor, electrical power system 230 may facilitate continued operation under a reduced thrust mode in view of the isolation of high voltage electrical load 236-1 and no thrust being generated by the electric motor.

Figure 2C:
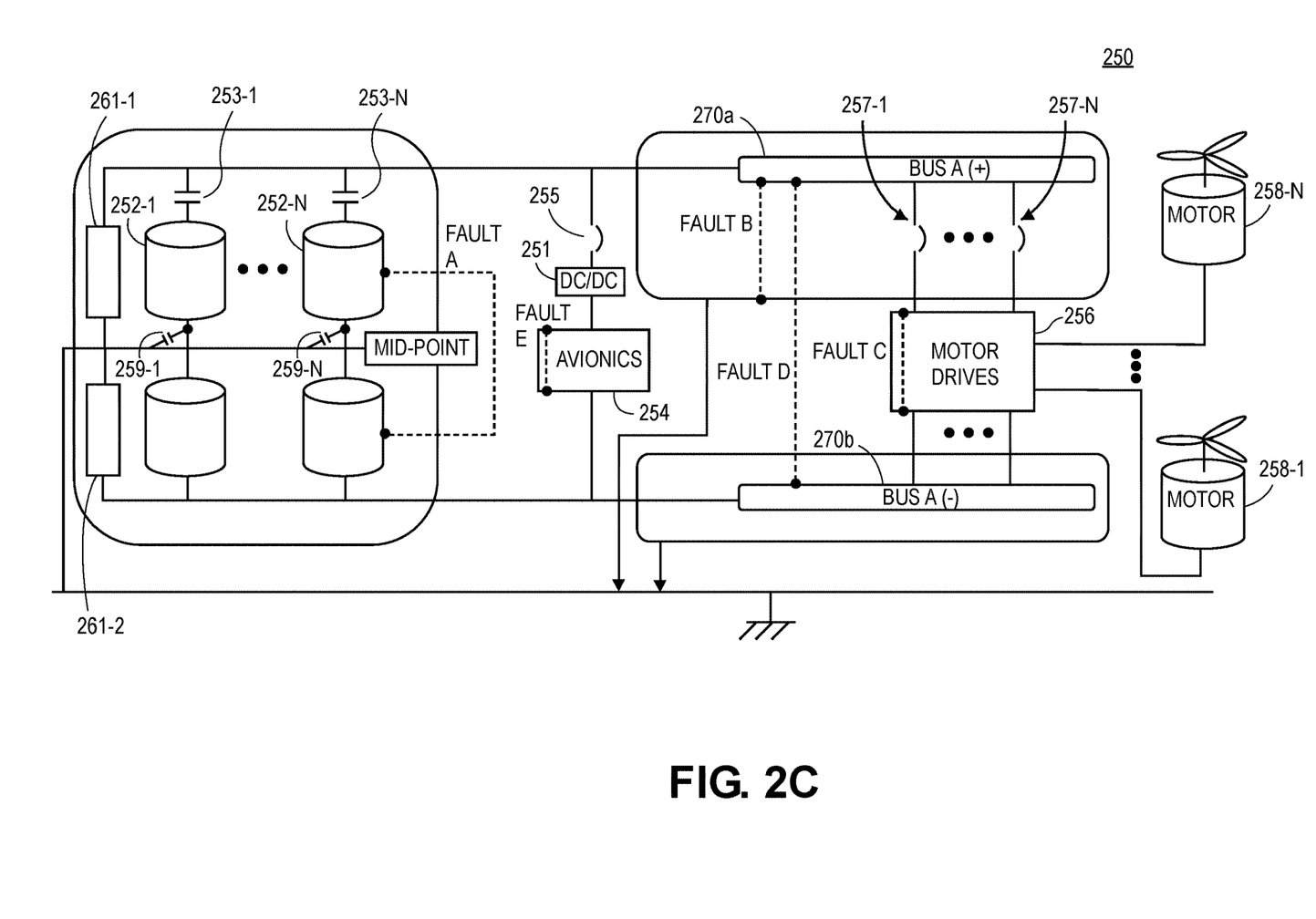
FIG. 2C is a schematic illustration of an exemplary electrical power system, according to exemplary embodiments of the present disclosure.

FIG. 2C is a schematic illustration of an exemplary electrical power system 250, according to exemplary embodiments of the present disclosure. FIG. 2C illustrates an exemplary implementation where electrical power system 250 is employed in an aerial vehicle (e.g., aerial vehicle 100) and certain fault and/or failure conditions that may be experienced by the various components of electrical power system 250.

As shown in FIG. 2C, electrical power system 250 can include battery strings 252, DC-to-DC converter 251, avionics system 254 (which may be considered to be a low voltage electrical load), and motor drives 256 (which may include, for example, inverters, ESCs, and the like, which may be configured to drive and/or control motors 258-1 and 258-N (which may be considered to be high voltage electrical loads) all electrically coupled to a shared direct current (DC) bus, with positive voltage rail 270a and negative voltage rail 270b. As shown in FIG. 2B, battery strings 252 may be electrically coupled to the shared DC bus via respective protection devices 253, avionics system 254 may be electrically coupled to the shared DC bus via DC-to-DC converter 251 and protection device 255, and motor drives 256 may be electrically coupled to the shared DC bus via respective protection devices 257. Specifically, battery strings 252-1 and 252-N may be electrically coupled to the shared DC bus via respective protection devices 253-1 and 253-N, respectively, avionics systems 254 may be electrically coupled to the shared DC bus via protection device 255, and motor drives 256 may be electrically coupled to the shared DC bus via respective protection devices 257-1 and 257-N, respectively. Further, electrical power system 250 may include a midpoint ground connection configuration where a midpoint of each respective battery string 252 may be electrically coupled to ground via protection devices 259-1 and 259-N and to ground via high-impedance networks 261-1 and 261-2. As shown in FIG. 2C, the midpoint grounding configuration may be implemented as part of the source (e.g., as part of the batteries strings 252) of electrical power system 250. However, according to exemplary embodiments of the present disclosure, the midpoint grounding configuration may be implemented anywhere within electrical power system 250.

According to exemplary embodiments of the present disclosure, electrical power system 250 may include any number of battery strings 252, avionics systems 254 (or other low voltage electrical loads), and/or motor drives 256 (or other high voltage electrical loads). According to exemplary embodiments of the present disclosure, battery strings 252 may each include a battery string comprised of serially connected battery cells. In certain exemplary implementations, each battery string may include distributed internal protection devices (e.g., switches, circuit breakers, fuses, fusible links, etc.) between at least some of the individual battery cells, which can also be configured to isolate and clear certain fault and/or failure conditions experienced by each battery string.

Further, protection devices 253, 255, 257, and 259 may include any type of protection and/or isolation device which may be configured to electrically isolate a corresponding component (e.g., battery strings 252, avionics system 254, motor drives 256, and/or the midpoint ground connection). For example, protection devices 253, 255, 257, and 259 may include switches, fuses, circuit breakers, fusible links, and the like, which may be configured to electrically isolate a corresponding component in view of certain fault and/or failure conditions.

According to exemplary implementations of the present disclosure, electrical power system 250 may be configured to facilitate continued operation in the event of certain fault and/or failure conditions. As illustrated in FIG. 2C, electrical power system 250 may experience various different types of fault and/or failure conditions. As indicated by FAULT A in FIG. 2C, one or more battery strings 252 may experience a fault and/or failure condition. Fault and/or failure conditions experienced by battery strings 252 may include, for example, an internal short circuit within a battery cell, an internal short circuit within the battery string, and the like. Accordingly, in the event that one or more battery strings 252 of electrical power system 250 experiences a fault and/or failure condition, the faulty battery string may be isolated via protection devices 253 and 259. For example, in an exemplary implementation where battery string 252-1 is experiencing a fault and/or failure condition, protection device 253-1 may open, so as to electrically isolate battery string 252-1 from the shared DC bus, and protection device 259-1 may open to isolate battery string 252-1 from the remaining battery strings 252, so as to prevent current to flow from battery string 252-1 to the remaining battery strings 252 via the midpoint ground connection. In view of the isolation of battery string 252-1, battery string 252-1 may no longer be providing electrical power to the electrical loads of electrical power system 250, such as avionics system 254 and/or motor drives 256. Accordingly, the aerial vehicle in which electrical power system 250 may be implemented may continue to operate in a reduced electrical power mode from the electrical power provided by the remaining battery strings 252 that are not experiencing a fault and/or failure condition and have not been isolated.

As shown in FIG. 2C, electrical power system 250 may also experience a line to ground fault and/or failure condition, as indicated by FAULT B in FIG. 2C. Although FIG. 2C illustrates FAULT B to be a line to ground fault from positive voltage rail 270a to ground, a line to ground fault may also be experienced as a short circuit condition from negative voltage rail 270b to ground. In the event that electrical power system 250 experiences a line to ground short circuit condition, as indicated by FAULT B, midpoint ground configuration implemented using high-impedance networks 261 is configured to facilitate shifting of the voltages on the shared DC bus, so as to permit continued operation with the shifted voltages. For example, in an exemplary implementation where the rail-to-rail voltage between positive voltage rail 270a to negative voltage rail 270b is $V_{DC}$, a line to ground fault and/or failure condition would result in the voltages of the shared DC bus shifting such that the voltage on positive voltage rail 270a is $$\frac{1}{2}V_{DC}$$

and the voltage on negative voltage rail 270b is $$-\frac{1}{2}V_{DC}.$$

Accordingly, although the voltages on positive voltage rail 270a and negative voltage rail 270b have shifted, the rail-to-rail voltage on the shared DC bus is maintained at $V_{DC}$, thereby facilitating continued operation of the various loads at the desired rail-to-rail DC voltage levels.

FIG. 2C also illustrates a fault and/or failure condition that may be experienced by one or more of motor drives 256, as indicated by FAULT C in FIG. 2C. As indicated by FAULT C in FIG. 2C, one or more of motor drives 256 may experience a fault and/or failure condition. Although FIG. 2C illustrates motor drives 256 as a single box with multiple connections to positive voltage rail 270a and negative voltage rail 270b, motor drives may be implemented as multiple discrete motor drives. Fault and/or failure conditions experienced by motor drives 256 may include, for example, an internal line to line short circuit, an internal line to ground short circuit, and the like. Accordingly, in the event that one or more motor drives 256 of electrical power system 250 experiences a fault and/or failure condition, the faulty motor drive(s) may be isolated via corresponding protection devices 257. For example, in an exemplary implementation where a first motor drive of motor drives 256 is experiencing a fault and/or failure condition, protection device 257-1 may open, so as to electrically isolate the faulty motor drive from the shared DC bus. Isolation of the faulty motor drive would cause the motor driven by the faulty and isolated motor drive (e.g., motor 258-1) to be inoperable. Accordingly, the aerial vehicle may continue to operate in a reduced thrust mode with thrust being produced by the remaining motors 258 that are associated with the remaining motor drives 256 that are not experiencing a fault and/or failure condition and have not been isolated.

Similarly, electrical power system 250 can also provide mechanisms to isolate fault and/or failure conditions that may be experienced by avionics system 254, as indicated by FAULT E. As indicated by FAULT E in FIG. 2C, one or more of avionics systems 254 (or other low voltage electrical loads) may experience a fault and/or failure condition. Fault and/or failure conditions experienced by avionics systems 254 may include, for example, an internal line to line short circuit, an internal line to ground short circuit, and the like. Accordingly, in the event that one or more avionics systems 254 of electrical power system 250 experiences a fault and/or failure condition, the faulty avionics system(s) 254 and/or DC-to-DC converter 251 may be isolated via corresponding protection devices 255. Accordingly, the aerial vehicle may continue to operate in a reduced capacity mode based on other and/or redundant avionics systems that are not experiencing a fault and/or failure condition and have not been isolated.

Exemplary electrical power system 250 also include features to mitigate line to line faults, as indicated by FAULT D in FIG. 2C. As shown in FIG. 2C, line to line faults and/or failure conditions may include a line-to-line short circuit between positive voltage rail 270a and negative voltage rail 270b. Accordingly, to mitigate and/or protect against such line-to-line faults and/or failure conditions, as indicated by FAULT D, electrical power system 250 may include physical and electrical separation features to protect against such line-to-line faults. For example, positive voltage rail 270a and negative voltage rail 270b may be configured and arranged to ensure physical separation between positive voltage rail 270a and negative voltage rail 270b. Further, positive voltage rail 270a and negative voltage rail 270b may be arranged and configured with insulating materials to provide further electrical separation between positive voltage rail 270a and negative voltage rail 270b.

Figure 3:
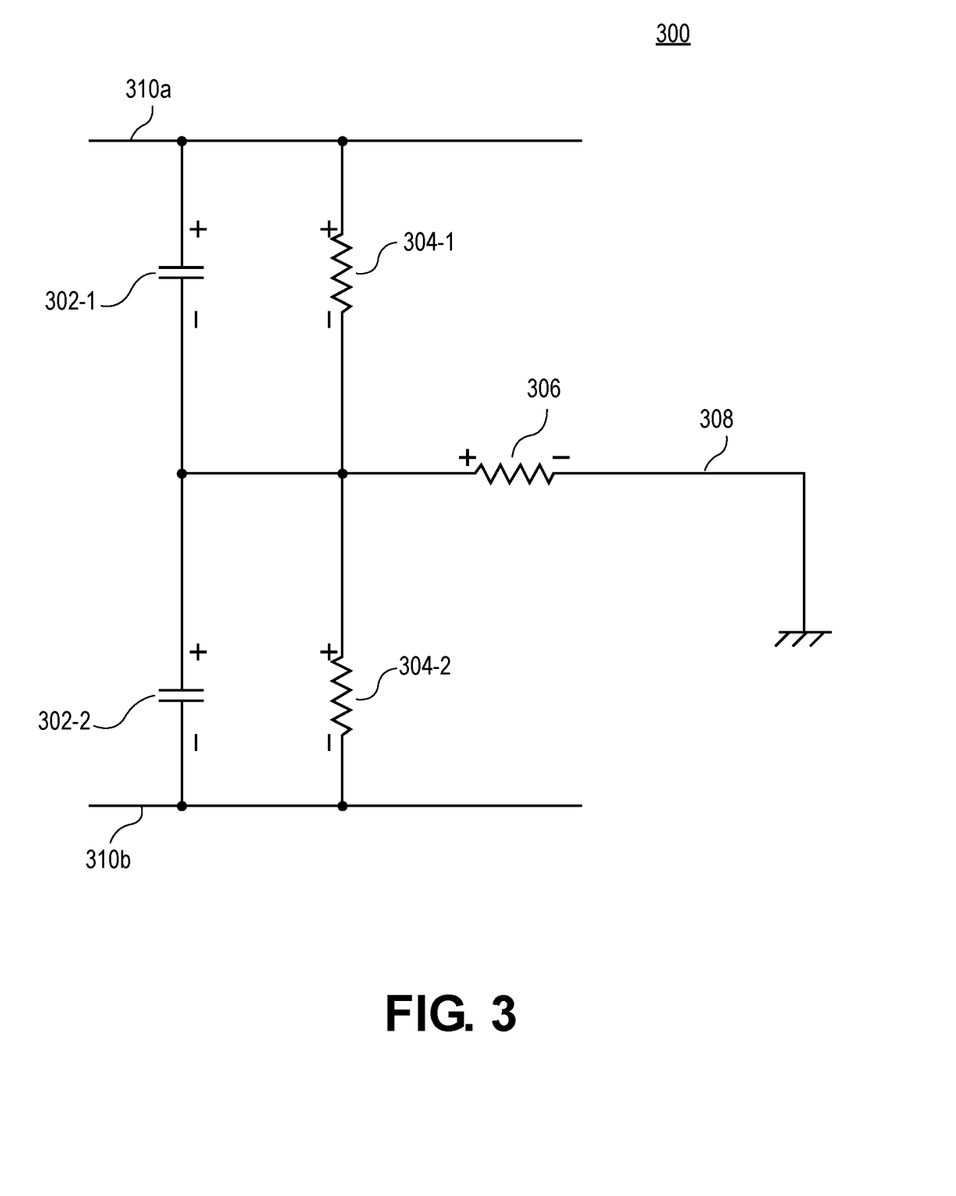
FIG. 3 is a schematic illustration of an exemplary high-impedance grounding network, according to exemplary embodiments of the present disclosure.

FIG. 3 is a schematic illustration of an exemplary high-impedance grounding network 300, according to exemplary embodiments of the present disclosure. High-impedance grounding network 300 illustrated in FIG. 3 may be one exemplary implementation of high-impedance networks 212 and 242 shown in FIGS. 2A and 2B, respectively, and/or a high-impedance ground network formed by high-impedance networks 261-1 and 261-2, shown in FIG. 2C, which can facilitate a midpoint grounding configuration according to exemplary embodiments of the present disclosure. High-impedance grounding network 300 may be implemented in a power supply of an electrical power system (e.g., as shown in FIGS. 2A and 2C) or anywhere else in an electrical power system (e.g., as shown in FIG. 2B).

As shown in FIG. 3, high-impedance grounding network 300 can include capacitors 302-1 and 302-2, resistors 304-1, 304-2, and 306, and ground connection 308. According to exemplary embodiments of the present disclosure, high-impedance grounding network 300 can facilitate a midpoint ground configuration, which may be implemented in an electrical power system. For example, capacitors 302-1 and 302-2 and resistors 304-1, 304-2, and 306 may be selected to define ground relative to positive voltage rail 310a and negative voltage rail 310b while limiting the ground fault current in the event of a line to ground fault and/or failure condition. For example, in an exemplary implementation where the impedance presented by capacitor 302-1 and resistor 304-1 is the same as the impedance presented by capacitor 302-2 and resistor 304-2, ground may be defined as the midpoint between positive voltage rail 310a and negative voltage rail 310b. Accordingly, in an exemplary implementation where the rail-to-rail voltage between positive voltage rail 310a to negative voltage rail 310b is $V_{DC}$, a line to ground fault and/or failure condition would result in the voltages of the shared DC bus shifting such that the voltage on positive voltage rail 310a is $$\frac{1}{2}V_{DC}$$

and the voltage on negative voltage rail 310b is $$-\frac{1}{2}V_{DC}.$$

Accordingly, although the voltages on positive voltage rail 310a and negative voltage rail 310b have shifted, the rail-to-rail voltage on the shared DC bus is maintained at $V_{DC}$, thereby facilitating continued operation of the various loads at the desired rail-to-rail DC voltage levels.

Preferably, high-impedance grounding network 300 may be implemented at the source of an electrical power system to facilitate a midpoint grounding. Alternatively and/or in addition, high-impedance grounding network 300 may be implemented anywhere else in the electrical power system to define ground relative to the positive and negative voltage rails.

Figure 4:
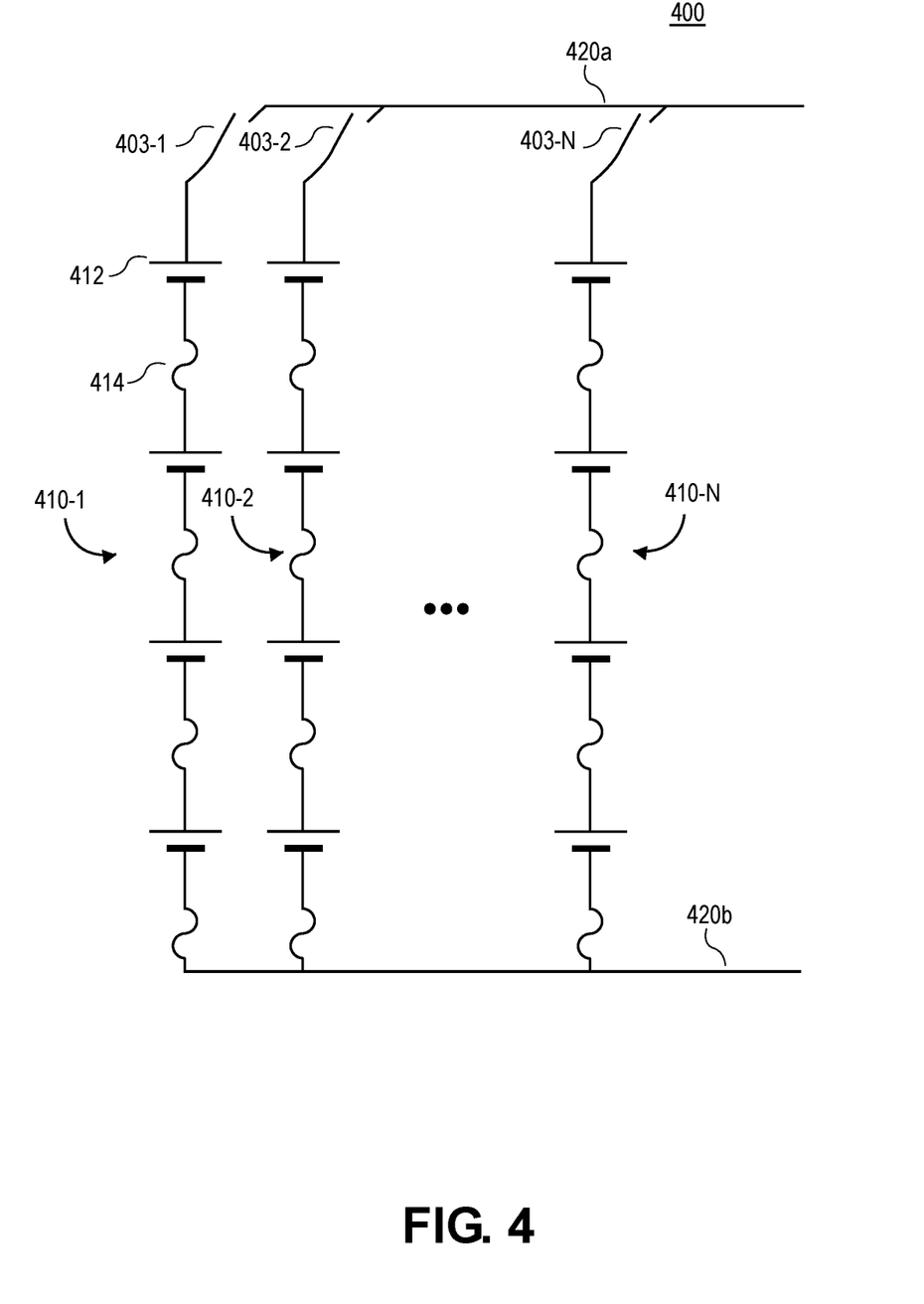
FIG. 4 is a schematic illustration of an exemplary battery string configuration, according to exemplary embodiments of the present disclosure.

FIG. 4 is a schematic illustration of an exemplary battery string configuration 400, according to exemplary embodiments of the present disclosure. Battery string configuration 400 illustrated in FIG. 4 may be an exemplary implementation of a power supply (e.g., power supply 202, battery string 252, etc.) according to exemplary embodiments of the present disclosure.

As shown in FIG. 4, exemplary battery string configuration 400 may include any number of battery strings 410 (e.g., battery strings 410-1, 410-2, 410-N, etc.), which may be electrically coupled to positive voltage rail 420a of a shared DC bus and negative voltage rail 420b of the shared DC bus. Each battery string 410 may include multiple serially connected battery cells 412, with a distributed arrangement of internal protection devices 414. Further, each battery string 410 may be electrically coupled to the shared DC bus via protection devices 403. For example, battery string 410-1 may be electrically coupled to the shared DC bus via protection device 403-1, battery string 410-2 may be electrically coupled to the shared DC bus via protection device 403-2, and battery string 410-N may be electrically coupled to the shared DC bus via protection device 403-N. According to certain exemplary implementations of the present disclosure, protection devices 403 may correspond to protection devices 203 and/or 253, as illustrated in FIGS. 2A and 2C.

According to exemplary embodiments of the present disclosure, the distributed arrangement of internal protection devices 414 may be arranged and configured between each individual battery cell 412 (e.g., as shown in FIG. 4). Alternatively, protection devices 414 may be arranged and positioned between every other individual battery cell 412, between every third individual battery cell 412, etc. In operation, the distributed arrangement of internal protection devices 414 may provide a similar function to protection devices 259, as shown in FIG. 2C. For example, in the event that one or more battery strings 410 may experience a fault and/or failure condition (e.g., an internal short circuit within a battery cell, an internal short circuit within the battery string, and the like), the corresponding protection device 403 and one or more of protection devices 414 may open isolate the faulty battery string. In an exemplary implementation where battery string 410-1 may be experiencing a fault and/or failure condition, protection device 403-1 may open, so as to electrically isolate battery string 410-1 from the shared DC bus, and one or more of protection devices 414 in battery string 410-1 may open to isolate battery string 410-1 from the remaining battery strings 410, so as to prevent current to flow from battery string 410-1 to the remaining battery strings 410 via a midpoint ground connection (not shown).

Further, according to one exemplary implementation, protection devices 403 may include fast acting switches and protection devices 414 may include slow acting fuses and/or fusible links. Accordingly, the combination of fast acting switches as protection devices 403 and slow acting fuses and/or fusible links as protection devices 414 may provide an advantageous combination of fast performance, while also providing a lightweight and compact battery string design. This combination of performance and lightweight/compact design can be of particular benefit to aerospace applications, where weight savings and criticality of performance are desirable.

Figure 5:
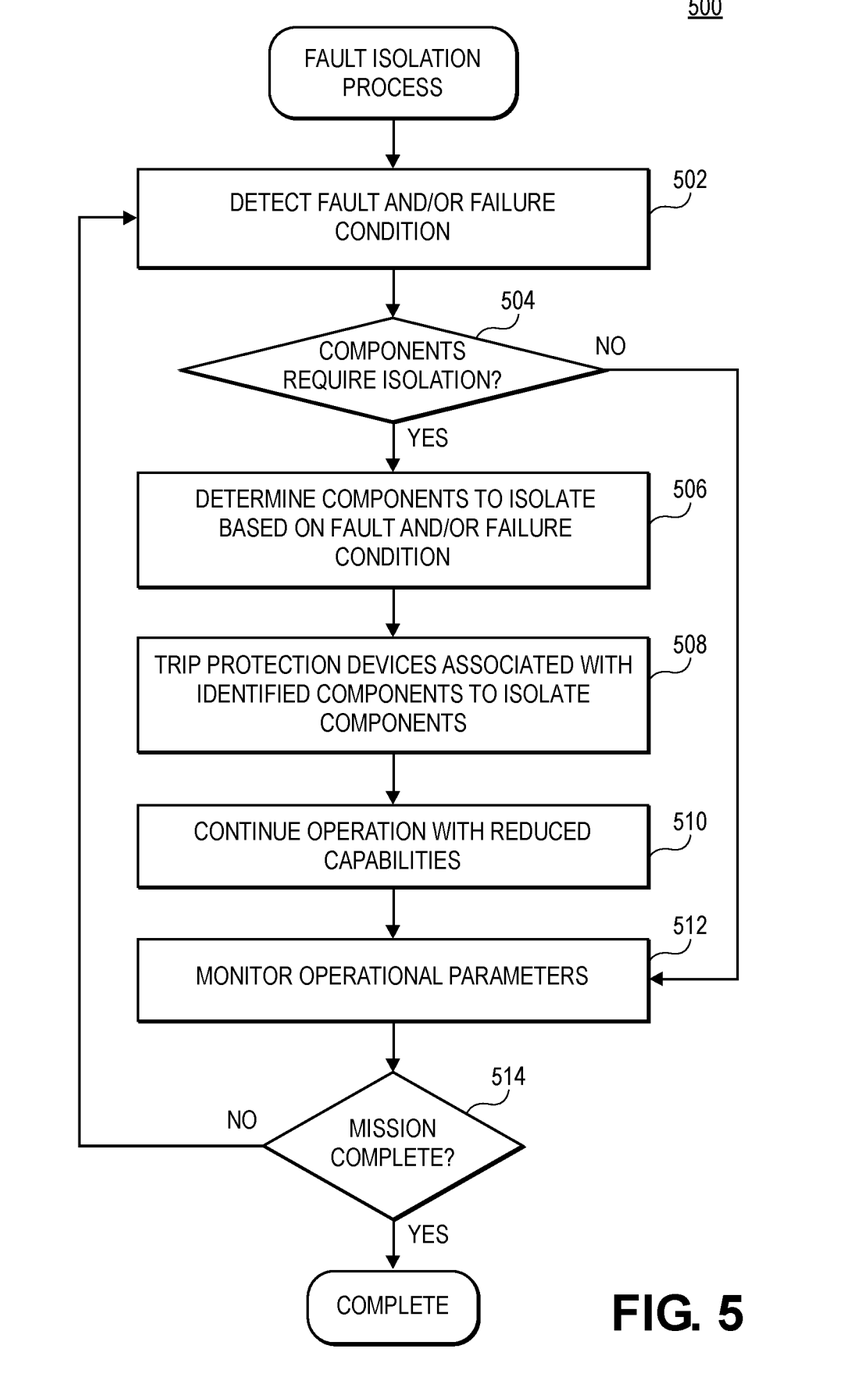
FIG. 5 is a flow diagram of an exemplary fault isolation process, according to exemplary embodiments of the present disclosure.

FIG. 5 is a flow diagram of an exemplary fault isolation process 500, according to exemplary embodiments of the present disclosure. Fault isolation process 500 may be performed, for example, during aerial operation of an aerial vehicle which may include an electrical power system, such as electrical power system 200 and/or 250.

As shown in FIG. 5, exemplary fault isolation process 500 may begin with detection of a fault and/or failure condition, as in step 502. For example, the detected fault and/or failure condition may include a fault and/or failure condition associated with one or more power supplies (e.g., a short circuit within a battery string, a short circuit within a battery cell, and the like), a fault and/or failure condition associated with one or more low voltage electrical loads, a fault and/or failure condition associated with one or more high voltage electrical loads, a line to ground fault in a shared DC bus, and the like.

Upon detection of the fault and/or failure condition, in step 504, it may be determined if one or more components require isolation in view of the detected fault and/or failure condition. For example, a line to ground fault experienced in the shared DC bus may be mitigated by a midpoint grounding scheme, according to exemplary embodiments of the present disclosure, and may not require any components to be isolated. In the event that it is determined that components are to be isolated, in step 506, the components to be isolated may be determined based on the detected fault and/or failure condition.

In step 508, after the components to be isolated have been identified, protection devices associated with the components to be isolated may be tripped, so as to isolate the identified components. For example, in the event a fault and/or failure condition is detected in connection with one or more battery strings, the protection devices associated with the faulty battery strings may be tripped, so as to isolate the one or more faulty battery strings. Similarly, in the event that a fault and/or failure condition is detected in connection with a motor drive, the protection devices associated with the faulty motor drives may be tripped, so as to isolate the faulty motor drive.

Upon isolation of the identified components in response to the detected fault and/or failure condition, the aerial vehicle may continue operation in a reduced capability mode, as in step 510. For example, in the event that the detected fault and/or failure condition results in isolation of a motor drive such that the corresponding motor is rendered inoperable, the aerial vehicle may continue to operate in a reduced thrust mode. Similarly, if the detected fault and/or failure condition results in isolation of a battery string, the aerial vehicle may continue to operate in a reduced electrical power mode. In step 512, the operational parameters of the aerial vehicle may continue to be monitored, and fault isolation process 500 may return to step 502, until the mission that the aerial vehicle is performing is completed, as determined in step 514.

Figure 6:
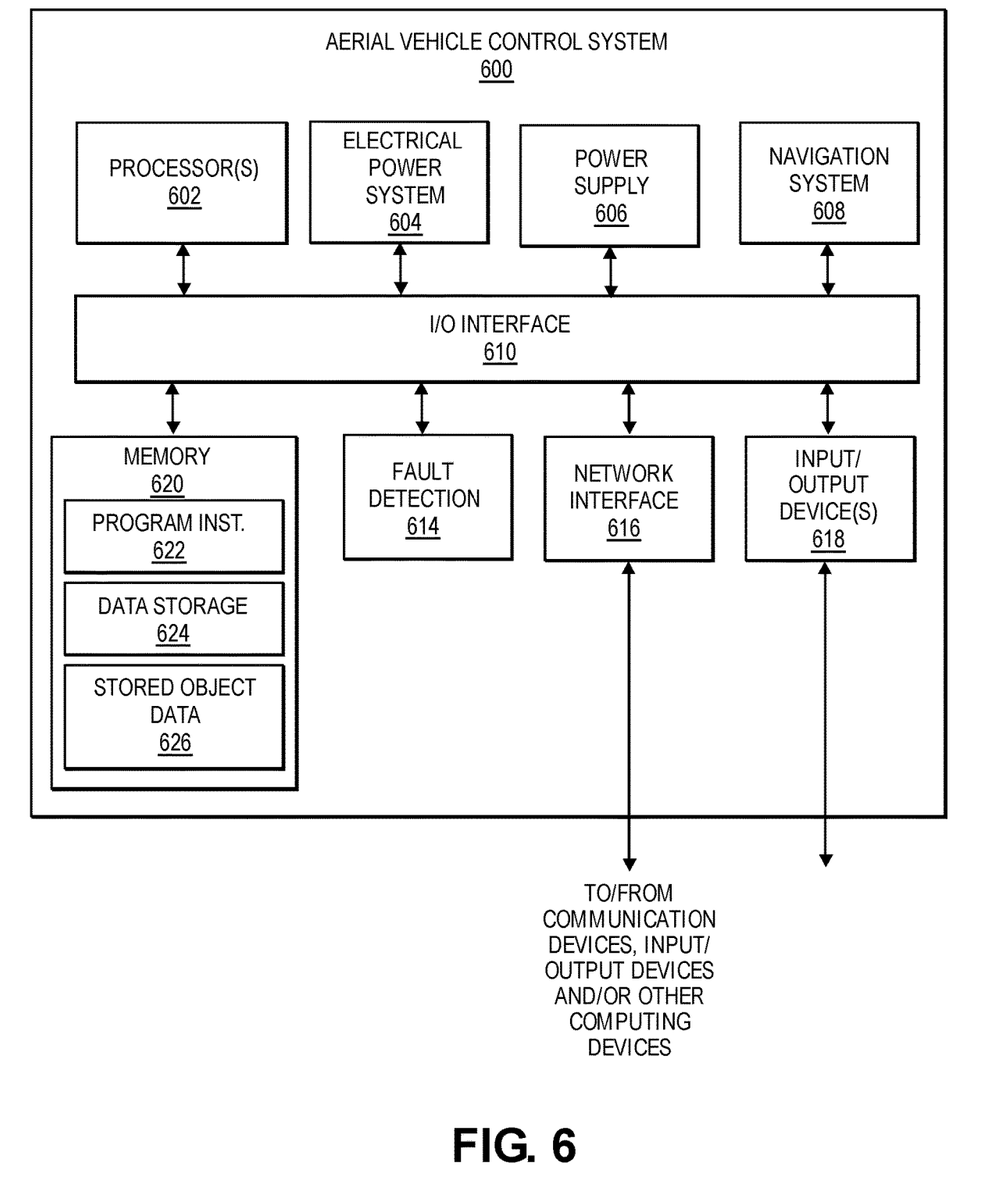
FIG. 6 is a block diagram illustrating various components of an exemplary aerial vehicle control system, according to exemplary embodiments of the present disclosure.

FIG. 6 is a block diagram illustrating various components of an exemplary aerial vehicle control system 600, according to exemplary embodiments of the present disclosure.

In various examples, the block diagram may be illustrative of one or more aspects of the aerial vehicle control system 600 that may be used to implement the various systems and processes discussed above. In the illustrated implementation, the aerial vehicle control system 600 includes one or more processors 602, coupled to a non-transitory computer readable storage medium 620 via an input/output (I/O) interface 610. The aerial vehicle control system 600 may also include electrical power system 604, a power supply or battery 606, navigation system 608, and fault detection systems 614. Aerial vehicle control system 600 may further include network interface 616 and one or more input/output devices 618.

In various implementations, the aerial vehicle control system 600 may be a uniprocessor system including one processor 602, or a multiprocessor system including several processors 602 (e.g., two, four, eight, or another suitable number). The processor(s) 602 may be any suitable processor capable of executing instructions. For example, in various implementations, the processor(s) 602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 602 may commonly, but not necessarily, implement the same ISA.

The non-transitory computer readable storage medium 620 may be configured to store executable instructions, data, load balancing information, arrangement and/or configuration information relating to the propulsion mechanisms and their associated electronic speed controllers, and/or other data items accessible by the processor(s) 602. In various implementations, the non-transitory computer readable storage medium 620 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 620 as program instructions 622, data storage 624, and stored object data 626, respectively. In other implementations, program instructions and/or stored data may be received, sent or stored upon different types of computer-accessible media, such as non-transitory media, or on similar media separate from the non-transitory computer readable storage medium 620 or the aerial vehicle control system 600.

Generally, a non-transitory, computer readable storage medium may include storage media or memory media such as magnetic or optical media, e.g., disk or CD/DVD-ROM, coupled to the aerial vehicle control system 600 via the I/O interface 610. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 616.

In one implementation, the I/O interface 610 may be configured to coordinate I/O traffic between the processor(s) 602, the non-transitory computer readable storage medium 620, and any peripheral devices, the network interface or other peripheral interfaces, such as input/output devices 618. In some implementations, the I/O interface 610 may perform any necessary protocol, timing or other data transformations to convert data signals from one component (e.g., non-transitory computer readable storage medium 620) into a format suitable for use by another component (e.g., processor(s) 602). In some implementations, the I/O interface 610 may include support for devices attached through various types of peripheral buses, such as a variant of the Peripheral Component Interconnect (PCI) bus standard or the Universal Serial Bus (USB) standard, for example. In some implementations, the function of the I/O interface 610 may be split into two or more separate components, such as a north bridge and a south bridge, for example. Also, in some implementations, some or all of the functionality of the I/O interface 610, such as an interface to the non-transitory computer readable storage medium 620, may be incorporated directly into the processor(s) 602.

The electrical power system 604 may be configured to isolate various components in the event of a fault and/or failure condition by fault detection system 614. Further, motor drives (e.g., such as an ESC) may communicate with the navigation system 608 and adjust the operational characteristics of each propulsion mechanism to guide the aerial vehicle along a determined path and/or to perform other navigational maneuvers. The navigation system 608 may include a GPS, IMU, altimeter, speed sensors, or other similar system than can be used to navigate the aerial vehicle to and/or from a location.

The aerial vehicle control system 600 may also include fault detection system 614, that communicates with the processor(s) 602, the non-transitory computer readable storage medium 620, power supply 606, electrical power system 604, and/or other components or systems described herein to isolate various components experiencing a fault and/or failure condition.

The network interface 616 may be configured to allow data to be exchanged between the aerial vehicle control system 600, other devices attached to a network, such as other computer systems, imaging sensors, and/or control systems of other vehicles, systems, machines, equipment, apparatuses, or devices. For example, the network interface 616 may enable wireless communication between numerous aerial vehicles. In various implementations, the network interface 616 may support communication via wireless general data networks, such as a Wi-Fi network. For example, the network interface 616 may support communication via telecommunications networks such as cellular communication networks, satellite networks, and the like.

Input/output devices 618 may, in some implementations, include one or more displays, imaging sensors, image capture devices, thermal sensors, infrared sensors, time of flight sensors, accelerometers, pressure sensors, weather sensors, various other sensors described herein, etc. Multiple input/ output devices 618 may be present and controlled by the aerial vehicle control system 600. One or more of these sensors may be utilized to assist in performing the various functions, operations, and processes described herein.

As shown in FIG. 6, the memory may include program instructions 622, which may be configured to implement the example processes and/or sub-processes described above. The data storage 624 may include various data stores for maintaining data items that may be provided for performing the various functions, operations, and processes described herein. For example, the data storage 624 may include stored object data 626, such as trajectory/flight path/planning, wind data, preferred orientation data, failure condition data, DC current information, DC bus voltage information, motor information, flight operation information, flight transition data, vulnerable orientation data, and/or other data items.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in FIG. 5, orders in which such methods or processes are presented are not intended to be construed as any limitation on the claimed invention, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle, comprising:
   a plurality of propulsion mechanisms; and
   a power system, the power system including:
   a shared direct current (DC) bus;
   a plurality of battery strings each electrically coupled to the shared DC bus via a first respective protection device, wherein a midpoint of each of the plurality of battery strings is electrically coupled to ground via a second respective protection device and a high-impedance network;
   an avionics system electrically coupled to the shared DC bus via a step down converter and a third respective protection device; and
   a plurality of motor drives each electrically coupled to the shared DC bus via a fourth respective protection device,
   wherein, in response to a determination of a fault condition, the power system is configured to trip at least one of the first respective protection devices, the second respective protection devices, the third respective protection devices, or the fourth respective protection devices.

2. The aerial vehicle of claim 1, wherein in response to a fault condition detected in connection with a first battery string of the plurality of battery strings, the power system is configured to:
   trip the first respective protection devices associated with the first battery string and the second respective protection devices associated with the first battery string, so as to electrically isolate the first battery string.

3. The aerial vehicle of claim 1, wherein in response to a fault condition detected in connection with the avionics system, the power system is configured to:
   trip the third respective protection devices associated with the avionics system, so as to electrically isolate the avionics system.

4. The aerial vehicle of claim 1, wherein in response to a fault condition detected in connection with a first motor drive of the plurality of motor drives, the power system is configured to:
   trip the fourth respective protection devices associated with the first motor drive, so as to electrically isolate the first motor drive.

5. The aerial vehicle of claim 4, wherein electrical isolation of the first motor drive causes a first propulsion mechanism of the plurality of propulsion mechanisms driven by the first motor drive to cease generating thrust and the aerial vehicle operates in a reduced thrust mode.

6. The aerial vehicle of claim 1, wherein the electrical coupling of the midpoint of each of the plurality of battery strings is configured to, in response to a line to ground fault, shift a voltage of the shared DC bus while maintaining a rail-to-rail voltage of the shared DC bus.

7. An electrical power system, comprising:
a shared direct current (DC) bus;
a plurality of battery strings, each of the plurality of battery strings electrically coupled to the shared DC bus and including a respective plurality of first protection devices configured to electrically isolate the battery string from the shared DC bus;
a plurality of low voltage loads each electrically coupled to the shared DC bus via a step down converter and a second respective protection device; and
a plurality of high voltage loads each electrically coupled to the shared DC bus via a third respective protection device,
wherein, in response to a determination of a fault condition, the electrical power system is configured to trip at least one of the respective plurality of first protection devices, the second respective protection devices, or the third respective protection devices, so as to electrically isolate at least one of:
at least one of the plurality of battery strings;
at least one of the plurality of low voltage loads; or
at least one of the plurality of high voltage loads.

8. The electrical power system of claim 7, wherein each of the plurality of battery strings includes a plurality of serially connected battery cells and the respective plurality of first protection devices of each battery string includes:
a first battery string protection device electrically coupling the battery string to the shared DC bus; and
a distributed arrangement of second battery string protection devices arranged between at least some of the plurality of serially connected battery cells.

9. The electrical power system of claim 8, wherein the first battery string protection device includes a fast-acting switch, and the second battery string protection device includes slow-acting fusible links.

10. The electrical power system of claim 7, wherein the respective plurality of first protection devices of each battery string includes:
a first battery string protection device electrically coupling the battery string to the shared DC bus; and
a second battery string protection device electrically coupling a midpoint of the battery string to ground.

11. The electrical power system of claim 10, wherein the electrical coupling of the midpoint of each of the plurality of battery strings is configured to, in response to a line to ground fault, shift a voltage of the shared DC bus while maintaining a rail-to-rail voltage of the shared DC bus.

12. The electrical power system of claim 7, wherein in response to a fault condition detected in connection with a first battery string of the plurality of battery strings, the power system is configured to:
trip at least two of the respective plurality of first protection devices associated with the first battery string, so as to electrically isolate the first battery string.

13. The electrical power system of claim 7, wherein in response to a fault condition detected in connection with a first low voltage load of the plurality of low voltage loads, the power system is configured to:
trip the second respective protection devices associated with the first low voltage load, so as to electrically isolate the first low voltage load.

14. The electrical power system of claim 7, wherein in response to a fault condition detected in connection with a high voltage load of the plurality of high voltage loads, the power system is configured to:
trip a corresponding protection device of the third respective protection devices associated with the high voltage load, so as to electrically isolate the high voltage load.

15. The electrical power system of claim 7, wherein:
the plurality of low voltage loads includes a plurality of avionics systems; and
the plurality of high voltage loads includes a plurality of motor drives.

16. A method for isolating a fault, the method comprising:
electrically coupling each of a plurality of battery strings to a shared direct current (DC) bus via a respective first protection device;
electrically coupling a midpoint of each of the plurality of battery strings to ground via a respective second protection device;
electrically coupling each of a plurality of low voltage loads to the shared DC bus via a step down converter and a respective third protection device;
electrically coupling each of a plurality of high voltage loads to the shared DC bus via a respective fourth protection device;
detecting a fault condition associated with at least one component, wherein the at least one component includes at least one of:
at least one of the plurality of battery strings;
at least one of the plurality of low voltage loads; or
at least one of the plurality of high voltage loads;
tripping, based at least in part on the detection of the fault condition, at least one of the respective first protection devices, the respective second protection devices, the respective third protection devices, or the respective fourth protection devices, so as to electrically isolate the at least one component.

17. The method of claim 16, wherein the at least one component includes a first battery string from the plurality of battery strings and tripping at least one of the respective first protection devices, the respective second protection devices, the respective third protection devices, or the respective fourth protection devices includes tripping the respective first protection device associated with the first battery string and the respective second protection device associated with the first battery string, so as to electrically isolate the first battery string.

18. The method of claim 16, wherein the at least one component includes a first low voltage load from the plurality of low voltage loads and tripping at least one of the respective first protection devices, the respective second protection devices, the respective third protection devices, or the respective fourth protection devices includes tripping the respective third protection device associated with the first low voltage load, so as to electrically isolate the first low voltage load.

19. The method of claim 16, wherein the at least one component includes a first high voltage load from the plurality of high voltage loads and tripping at least one of the respective first protection devices, the respective second protection devices, the respective third protection devices, or the respective fourth protection devices includes tripping the respective fourth protection device associated with the first high voltage load, so as to electrically isolate the first high voltage load.

20. The method of claim 16, wherein the electrical coupling of the midpoint of each of the plurality of battery strings is configured to, in response to a line to ground fault, shift a voltage of the shared DC bus while maintaining a rail-to-rail voltage of the shared DC bus.

* * * * *